Figure 5:
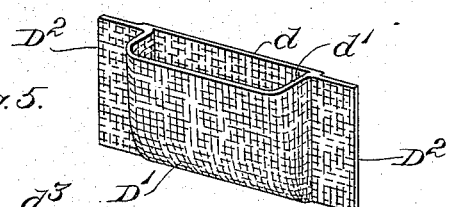

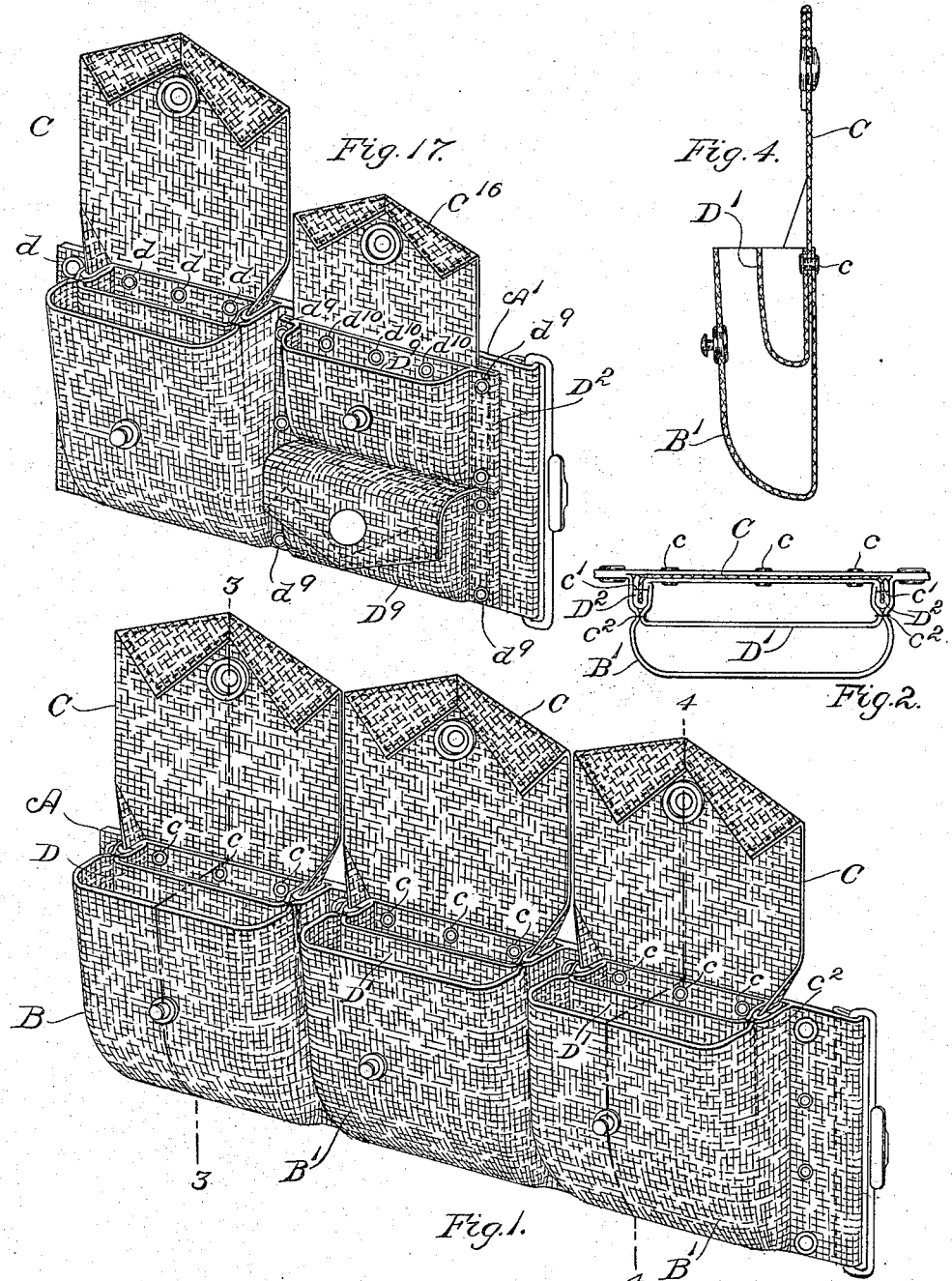

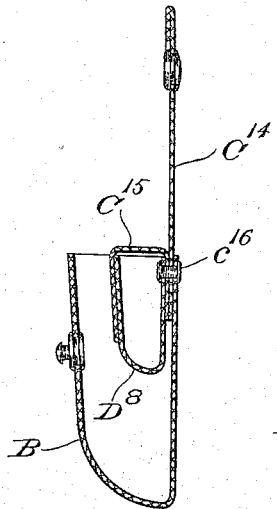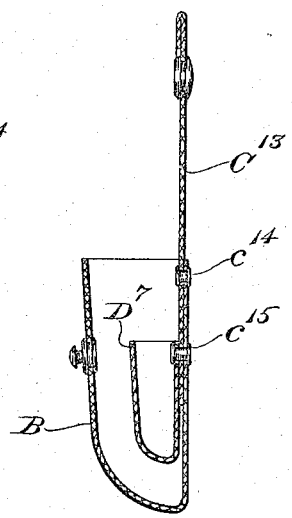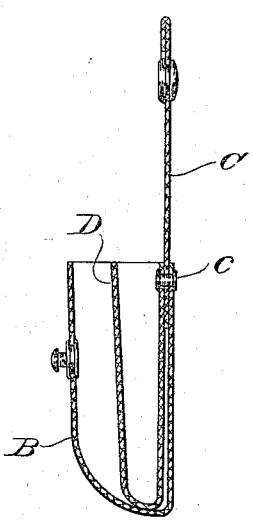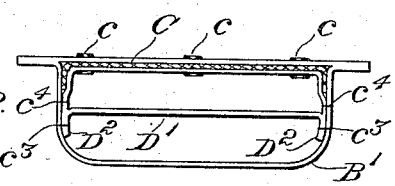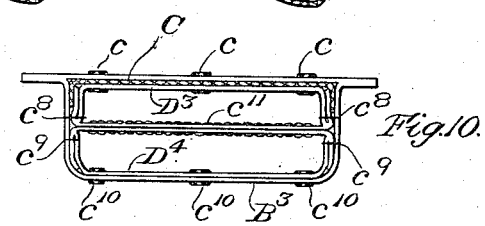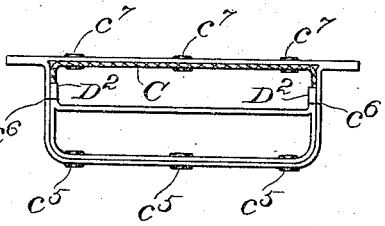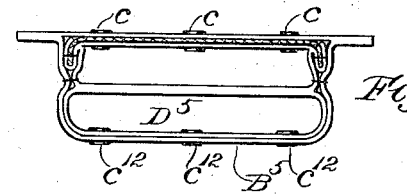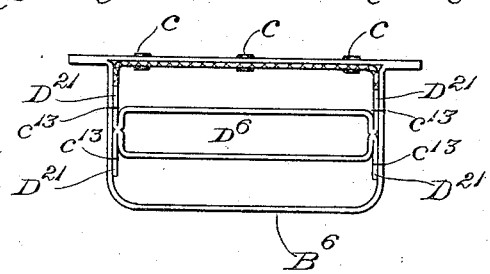

F. R. BATCHELDER.
CARTRIDGE BELT OR CARRIER.
APPLICATION FILED JUNE 7, 1911.

1,176,266.

Patented Mar. 21, 1916.
3 SHEETS—SHEET 3.

Witnesses:
Oscar F. Hill
Ellen O. Spring

Inventor:
Frank R. Batchelder
by Chas. F. Randall
Attorney.

UNITED STATES PATENT OFFICE.

FRANK R. BATCHELDER, OF WORCESTER, MASSACHUSETTS.

CARTRIDGE BELT OR CARRIER.

1,176,266.

Specification of Letters Patent. Patented Mar. 21, 1916.

Application filed June 7, 1911. Serial No. 631,835.

*To all whom it may concern:*

Be it known that I, FRANK ROE BATCHELDER, a citizen of the United States, residing at Worcester, in the county of Worcester, State of Massachusetts, have invented a certain new and useful Improvement in Cartridge Belts or Carriers, of which the following is a specification, reference being had therein to the accompanying drawings.

The invention has relation to the pockets of cartridge-belts or carriers, and of other articles having woven pockets, and to the protecting covers or flaps for such pockets.

The invention comprises various improvements in double or compound pockets of the class in which an external inclosing pocket or pouch has inserted into the same a pocket or pouch, made separately, and secured in place by suitable fastenings.

The invention consists in an inserted pocket of seamless tubular weave having fins which project from the exterior thereof, and which are engaged by suitable fastenings which secure the inserted pocket in place within the inclosing pocket.

Embodiments of the invention are shown in the drawings, in which—

Figure 6:
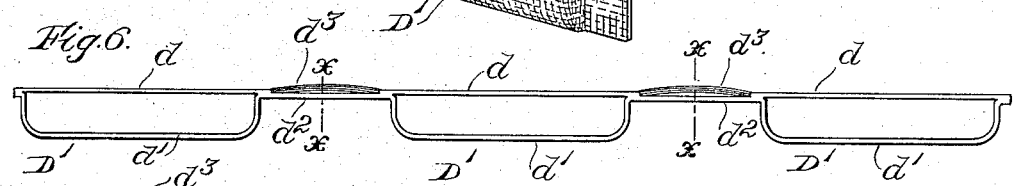
Figure 7:
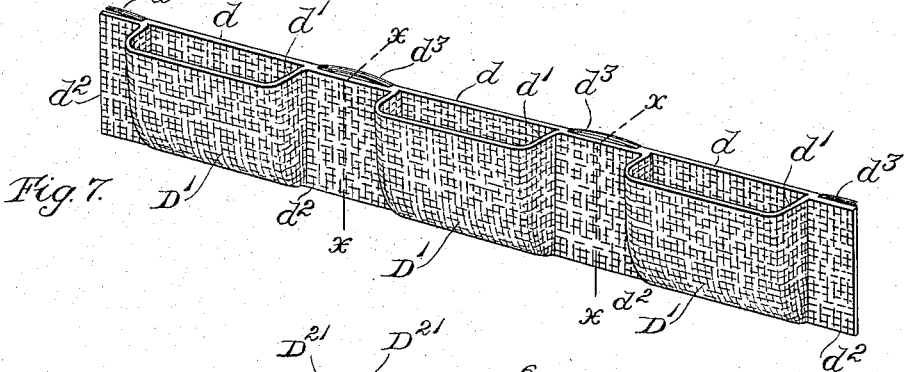
Figure 13:
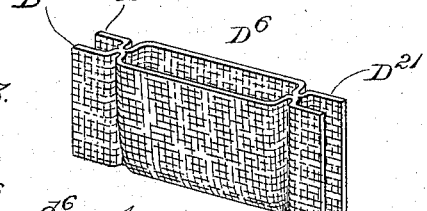
Figure 14:
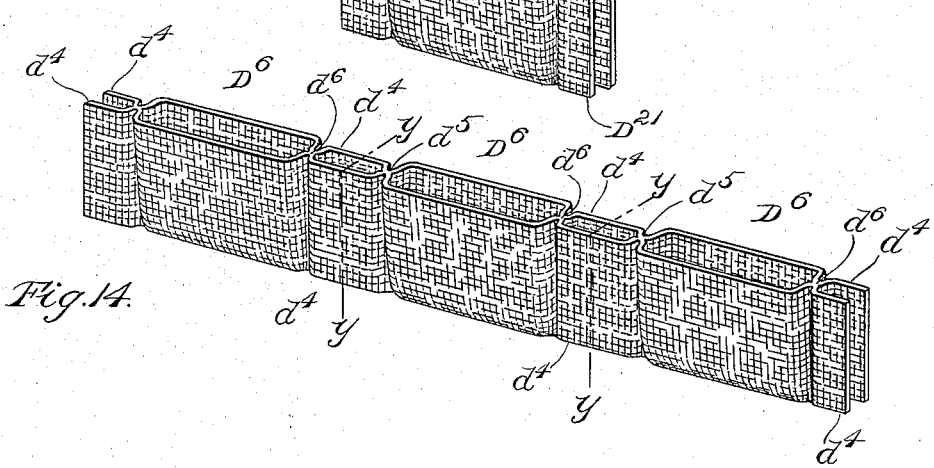

Figure 1 shows a portion of a cartridge-belt containing an embodiment of the invention. Fig. 2 is a view in plan of one of the double pockets of Fig. 1, with the cover or flap thereof in horizontal section on a line above the top of the said double pocket. Fig. 3, Sheet 2, is a view of the pocket B of Fig. 1, in section on the line 3, 3. Fig. 4, Sheet 1, is a view of one of the pockets B' of Fig. 1, in section on line 4, 4. Fig. 5, Sheet 3, shows separately one of the applied or inserted pockets. Fig. 6, same sheet, is a top edge view of a pocket-web intended to be cut up into separate pockets like that shown in Fig. 5. Fig. 7, same sheet, is a perspective view of the said pocket-web. Figs. 8 to 12, Sheet 2, show various embodiments of the invention. Fig. 13, Sheet 3, shows separately an applied or inserted pocket like that of Fig. 12. Fig. 14, same sheet, shows a pocket-web adapted to be cut up into pockets like that of Fig. 13. Figs. 15 and 16, Sheet 2, are sectional views of various embodiments of the invention. Fig. 17, Sheet 1, is a perspective view of a further embodiment of the invention.

In Fig. 1 the body of the cartridge-belt is marked A, and cartridge-pockets thereon are marked B, B', B', all of these being of the same size exteriorly. The flaps pertaining to the said pockets are marked C, C, C. Each of the pockets mentioned is shown as a double or compound pocket; that is to say, it is divided internally into two compartments, or individual pockets, with each compartment or individual pocket adapted to receive cartridges. However, in the case of some of the pockets of a belt or carrier, or of all thereof, except one or both of the two pockets B', B', adjacent each end thereof, the division may be omitted and each may contain a single large compartment adapted to receive two sets of cartridges held in clips, side by side, and contacting with each other, without any partition or other separation between the two sets.

Fig. 1 shows within each pocket B, B', B', an inserted pocket D or D'. Each pocket D, as shown by Fig. 3, is substantially equal in depth to the pocket B within which it is placed. Each pocket D', as shown by Fig. 4, is considerably shallower than the pocket B' within which it is placed. In Fig. 4 the depth of pocket D' is approximately one-half that of pocket B', although the relative sizes may vary. Each of the inserted pockets contains within it one of the compartments of the double pocket, while the other of such compartments intervenes between one wall of the inserted pocket and a wall of the inclosing pocket. As hereinbefore indicated, and in accordance with one feature of the invention, the inserted pocket is of seamless tubular weave, with a selvaged top edge that is finished in the weaving, and preferably, though not necessarily, in all cases, it is woven with a closed bottom. One of the pockets D' is shown separately in Fig. 5, Sheet 3, ready for being introduced into the inclosing pocket B' with which it is to be combined. The fins which, as above described, are provided upon the exterior of the inserted pocket, are marked $D^2$, $D^2$. They project from opposite side-portions of the said pocket. They are shown in straight extended condition in Fig. 5, and of their full original proportions, while in Figs. 1, 2, etc., they are shown trimmed to various widths variously disposed within the inclosing pockets.

The inserted pockets D, D', are produced by weaving a series or succession thereof in a continuous web, and afterward cutting them apart. A portion of a continuous web of pockets D', D', is represented in Figs.

6 and 7, Sheet 3. The said web is woven with tubular portions and with intermediate portions of solid weave. Each tubular portion is composed of two separate plies, $d$, $d'$ which in this instance are connected along one margin of the web to form the closed bottoms of the pockets. At the opposite margin of the web the said plies are woven with selvaged edges, smooth, firm and secure, bound and finished in the weaving. The tubular portions $d$, $d'$, alternate with the portions $d^2$, $d^2$, of solid weave. The two plies of a pocket are joined together at opposite sides of the pockets in the said portions of solid weave, and the warp-threads of such plies are anchored in such portions at the said sides. To reduce the thickness of the portions of solid weave some of the warp-threads may be floated, as at $d^3$, through the intermediate portion of the length of each portion of solid weave, and be subsequently trimmed away. The pockets $D'$, $D'$, are disconnected from one another by cutting the web transversely on the lines $x$, $x$, Figs. 6 and 7, and the floated portions of warp-threads are trimmed off, if this was not previously done. The portions of solid weave left projecting from opposite sides of the pocket constitute the fins $D^2$, $D^2$. In Figs. 5, 6, and 7, one of the plies, $d$, of the tubular portion of a pocket is shorter than the other, and straight. It constitutes the back of the pocket. The other, $d'$, is longer, and bulges forward. It constitutes the front of the pocket.

The location of the inserted pocket, and the manner of securing the same in place, may vary. In Figs. 1, 2, 3 (Sheet 2) and 4, each inserted pocket $D$, $D'$, is located at the rear within the corresponding inclosing pocket, with its own back wall adjacent that of the said inclosing pocket. In these embodiments of the invention, the lower end-portion of the cover or flap C intervenes between the back wall of the inserted pocket and the back wall of the inclosing pocket, and the said back walls and the said intervening portion of the cover or flap are securely fastened together. In this instance the fastening means comprises rivets $c$, $c$, $c$, in the form of eyelets which pass through all three thicknesses. The covers or flaps C, C, etc., preferably, are respectively of a width slightly greater than that of the respective inclosing pockets, in order that when the flaps are closed down into place their side-portions may completely overlie the side-portions of the pockets, so as to shield the same and protect the corresponding portions of the contents of the pockets. To enable the lower portions of the wide covers or flaps to be introduced into the inclosing pockets, the opposite side-margins of such portions are bent forward as shown in Figs. 1 and 2. The relative disposition of the fins $D^2$, $D^2$, may vary. In Figs. 1 and 2 the fins of each inserted pocket $B'$, are bent forward against the sides of the said pocket and then bent backward around the forwardly-bent side-margins of the corresponding cover or flap C so as to inclose the said margins. Fastenings, herein shown as stitches $c'$, $c'$, secure together the doubled-around fins and the cover- or flap-margins which they inclose, such stitches passing through all three thicknesses. The opposite sides of the inserted pocket are secured to the opposite sides of the inclosing pocket by fastenings which preferably are constituted by vertical lines of stitches $c^2$, $c^2$.

In some cases it may be found desirable to insert the pocket D or D' into the inclosing pocket in the bulging side or "front" thereof turned toward the back of the inclosing pocket, as represented in Fig. 8, Sheet 2, and with the fins $D^2$, $D^2$, extending toward the front of the inclosing pocket and stitched or otherwise fastened as at $c^3$, $c^3$, to the side-portions of the inclosing pocket. In this instance, the fastenings $c$, $c$, $c$, engage with the "front" of the inserted pocket $D'$. The forwardly-turned side-margins of the cover or flap C lie between the opposite sides of the inserted pocket and the corresponding sides of the inclosing pocket. The sides of one pocket are secured to those of the other by fastenings $c^4$, $c^4$, which in this instance are constituted by vertical lines of stitches.

While ordinarily the inserted or inner pocket will be located within the rear portion of the outer or inclosing pocket, so that one wall of the former will be close to the back wall of the outer or inclosing pocket, it may be desirable in some cases to locate the inner pocket within the forward portion of the outer pocket, as shown in Fig. 9, Sheet 2. In such case, the bulging "front" wall of the inserted pocket will be fastened, as by rivets $c^5$, $c^5$, $c^5$, to the front wall of the outer or inclosing pocket, and the fins $D^2$, $D^2$, of the inserted pocket will be extended rearward alongside the side-portions of the outer or inclosing pocket, and be conveniently attached thereto, as by vertical lines of stitches $c^6$, $c^6$. In this instance, also, the cover or flap C will be attached separately to the back of the outer or inclosing pocket by fastening, as rivets (eyelets) $c^7$, $c^7$, $c^7$.

Fig. 10 illustrates the manner in which two separate inserted pockets $D^3$, $D^4$, may be placed within a single outer or inclosing pocket $B^3$. In this instance, one of the inserted pockets has its bulging "front" turned toward the rear of the outer or inclosing pocket, and against the lower or inserted portion of the cover or flap C the fins of such inserted pocket being turned rearward against the side portions of such pocket, and between such side-portions and the forwardly-bent side-margins of a cover or flap, fastenings (stitches) $c^8$, $c^8$, serving to secure together the side-portions of the two pockets with the fins and side-margins of the cover or flap between them. The inserted pocket $D^4$ occupies the front portion of the outer or inclosing pocket $B^3$ with its front in contact with that of pocket $B^3$. Its fins are turned forward between its side-portions and those of the outer or inclosing pocket, fastenings $c^9$, $c^9$, serving to secure together the side-portions of the respective pockets with the said fins interposed between them. The front wall of the said inserted pocket $D^4$ is secured to the front wall of the outer or inclosing pocket $B^3$ by fastenings here constituted by rivets $c^{10}$, $c^{10}$, $c^{10}$. The contacting "back" walls of the inserted pockets $D^3$, $D^4$, are fastened together, as by stitches $c^{11}$.

Fig. 11 shows a construction in which a doubled inserted pocket $D^5$ woven with two compartments, one of the latter in front of the other thereof, is inserted into the other or inclosing pocket $B^5$. The fastenings at the rear and sides of the inserted pocket, and the disposition of the fins, are the same as in Fig. 2, and the front wall of the front compartment of the inserted pocket is attached to the front wall of the outer or inclosing pocket by the rivets (eyelets) $c^{12}$, $c^{12}$, $c^{12}$.

Fig. 12, Sheet 2, shows an inner pocket $D^6$ disposed intermediately within a large outer or inclosing pocket $B^6$ so as to provide three compartments. In this case the inner pocket has formed upon its exterior, at opposite sides thereof, double fins $D^{21}$, $D^{21}$, the two members of each double fin being turned oppositely away from each other in Fig. 12 so as to lie against the inner surfaces of the side-portions of the outer or inclosing pocket at the front and rear, respectively, of the inner or inserted pocket, the said members being suitably attached to the said side-portions as by vertical lines of stitches $c^{13}$, $c^{13}$, and $c^{13}$, $c^{13}$. The inserted pocket of Fig. 12 is shown separately in Fig. 13 of Sheet 3, and the method of producing the pocket is represented in Fig. 14 of the latter sheet. The method of producing the pocket with double fins is somewhat similar to that represented in Figs. 6 and 7 for producing inserted pockets with single fins, but differs therefrom in this, that the portions of web intervening between successive pockets $D^6$, $D^6$, instead of being solid, are formed intermediately in two separated plies $d^4$, $d^4$, for a short distance. Thus the two plies forming the front and back of a pocket D are first woven together in solid fabric, as at $d^5$, to tie such plies together at one side of the said pocket, and anchor the warp-threads of such plies; then the intermediate portion of the web is woven in two separate plies $d^4$, $d^4$, entirely unconnected at the opposite margin of the web; then solid fabric $d^6$ is again produced; and then the next succeeding pocket is formed by tubular weaving, and so on. The pockets are separated from one another by cutting transversely through the intermediate two ply portions on the lines $y$, $y$, Fig. 4. The two portions of a two-ply portion thus cut across constitute the double fins $D^{21}$, $D^{21}$, of Figs. 11 and 12. The pockets thus produced have, each, a selvaged top edge, which is finished in the weaving.

When the inserted pocket is of less depth than the outer or inclosing pocket the said inserted pocket may be set lower down within the outer or inclosing pocket than shown in Fig. 4, as at $D^7$ in Fig. 15, in which case two lines of rivets $c^{14}$, $c^{15}$, will be employed, one line, $c^{15}$, passing through the back wall of the inserted pocket $D^7$, the lower end of the cover or flap $C^{13}$, and the back wall of the outer or inclosing pocket, and serving to unite all three together and secure the inserted pocket in place, while the other line $c^{15}$ passes through the cover or flap and the back wall of the outer or inclosing pocket above the top of the inserted pocket, and serves simply to fasten the cover or flap near the top of the outer or inclosing pocket.

Fig. 16 illustrates an instance in which two covers or flaps are provided, the one, $C^{15}$, for the inserted pocket $D^8$, and the other, $C^{14}$, to extend over the tops of both the inserted pocket and the outer or inclosing pocket. Both of the said covers or flaps are attached by the same rivets (eyelets) $c^{16}$. The cover or flap may be secured in place, and its attaching end protected or shielded, by inserting a short attaching portion thereof between an inserted or applied pocket and an adjacent wall is illustrated in Figs. 3, 4, 15, 16 and 17. As indicated in Figs. 3, 4, 15 and 16, in which are shown pockets variously applied by being inserted within outer or inclosing pockets, the said attaching portion need extend below the upper end of the inserted or applied pocket only sufficiently to provide for the proper engagement therewith of the fastenings by which the cover or flap is secured in place. Fig. 17 illustrates a construction in which small pockets $D^9$, $D^9$, formed separately as illustrated in Fig. 5, are attached to the surface of the body $A'$, of the belt, partly by rivets $d^9$, $d^9$, passing through the projecting portions or fins $D^2$ of such small pockets and the said body, the said projecting portions or fins being doubled back upon themselves to conceal their cut ends, and partly by other rivets $d^{10}$, $d^{10}$, $d^{10}$, passing through the upper portion of the back of the applied pocket. In this instance the attaching portion of the cover or flap $C^{16}$ is inserted between the back of the applied pocket $D^9$ and engaged by the fastenings $d^{10}$, $d^{10}$, etc., that secure the said pocket $D^9$ across its top. The mode of combining the cover or flap with the applied pocket and the body of the cartridge-belt is the same in the case of each of the applied pockets of Fig. 17.

What is claimed as the invention is:—

1. The combination with an outer or inclosing pocket, of an inserted pocket of seamless tubular weave having fins upon the outside thereof, extending vertically upon such pocket and fastenings engaging with the said fins, and securing the inserted pocket in place within the inclosing pocket.

2. The combination with an outer or inclosing pocket, of an inserted pocket of seamless tubular weave having fins upon the outside thereof, extending vertically upon such pocket and also woven with a seamless closed bottom, and fastenings engaging with the said fins and securing the inserted pocket in place within the inclosing pocket.

3. The combination with an outer or inclosing pocket, of an inserted pocket of seamless tubular weave having lateral fins which project from the exterior thereof, fastenings engaging with the said fins, and other fastenings engaging with one of the walls of the inserted pocket, such fastenings securing the said pocket in place within the inclosing pocket.

4. The combination with an outer or inclosing pocket, of an inserted pocket of seamless tubular weave having lateral fins which project from the exterior thereof, and also woven with a seamless closed bottom, fastenings engaging with the said fins, and other fastenings engaging with one of the walls of the inserted pocket, such fastenings securing the said pocket in place within the inclosing pocket.

5. The combination with an outer or inclosing pocket, of an inserted pocket having lateral fins which project from the outside thereof, such fins extending vertically up and down the pocket and fastenings engaging with the said fins and securing the inserted pocket in place within the inclosing pocket.

6. The combination with an outer or inclosing pocket, of an inserted pocket having attaching portions extending vertically up and down upon opposite portions of the outside thereof, and fastenings engaging with said attaching portions and securing the inserted pocket in place within the inclosing pocket.

In testimony whereof I affix my signature in presence of two witnesses.

FRANK R. BATCHELDER.

Witnesses:
ROSA F. WOODCOCK,
GRACE E. MINOT.

Copies of this patent may be obtained for five cents each, by addressing the "Commissioner of Patents, Washington, D. C."